US008736883B2

(12) United States Patent
Matsumoto et al.

(10) Patent No.: US 8,736,883 B2
(45) Date of Patent: May 27, 2014

(54) IMAGE FORMING APPARATUS

(75) Inventors: Kazuyoshi Matsumoto, Tokyo (JP); Seiya Ogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 163 days.

(21) Appl. No.: 13/529,087

(22) Filed: Jun. 21, 2012

(65) Prior Publication Data

US 2013/0003121 A1 Jan. 3, 2013

(30) Foreign Application Priority Data

Jul. 1, 2011 (JP) ................................ 2011-147206

(51) Int. Cl.
*G06F 3/12* (2006.01)

(52) U.S. Cl.
USPC ........................... 358/1.15; 358/400; 358/442

(58) Field of Classification Search
CPC ............ B41J 29/00; B41J 29/12; B41J 29/13; G03G 21/1652; G03G 21/1657; G03G 2221/1678; H04N 1/00519; H04N 1/00538; H04N 1/00557; H04N 1/00559
USPC ......... 358/1.1, 1.15, 400, 401, 442, 296, 305; 455/90.3, 128, 347
See application file for complete search history.

(56) References Cited

U.S. PATENT DOCUMENTS

| | | | | |
|---|---|---|---|---|
| 6,181,284 | B1 * | 1/2001 | Madsen et al. | 343/702 |
| 7,580,398 | B2 * | 8/2009 | Nakamura | 370/338 |
| 7,657,245 | B2 * | 2/2010 | Nakagawa et al. | 455/301 |
| 2008/0100718 | A1 * | 5/2008 | Louks et al. | 348/211.2 |

FOREIGN PATENT DOCUMENTS

| | | | |
|---|---|---|---|
| JP | 2002-345027 | | 11/2002 |
| JP | 2008168590 | A * | 7/2008 |
| JP | 2008-260303 | | 10/2008 |
| JP | 2009-292123 | | 12/2009 |

* cited by examiner

*Primary Examiner* — Thomas D Lee
(74) *Attorney, Agent, or Firm* — Cooper & Dunham LLP

(57) ABSTRACT

An image forming apparatus for receiving a printing instruction of image data and forming an image according to the printing instruction includes a wireless communication device, an input unit, and a connector storage portion. The wireless communication device is disposed at a body of the image forming apparatus and has a cable and an output connector. The input unit has a wireless connection port to connect the output connector via the cable and a wired connection port to connect a wired cable from an external device. The input unit receives a printing instruction from any one of the wireless connection port and the wired connection port. The connector storage portion stores the output connector removed from the wireless connection port when the wireless communication device is not used. The connector storage portion, the wireless connection port, and the wired connection port are concentrated in one location.

11 Claims, 5 Drawing Sheets

IMAGE FORMING APPARATUS

CROSS-REFERENCE TO RELATED APPLICATION

This patent application is based on and claims priority pursuant to 35 U.S.C. §119 to Japanese Patent Application No. 2011-147206, filed on Jul. 1, 2011 in the Japan Patent Office, the entire disclosure of which is hereby incorporated by reference herein.

BACKGROUND

1. Technical Field

This disclosure relates to an image forming apparatus, and more specifically to an image forming apparatus for receiving printing instructions of image data and form images according to the printing instructions.

2. Description of the Related Art

Image forming apparatuses are used as printers, facsimile machines, copiers, plotters, or multi-functional devices having two or more of the foregoing capabilities. Such image forming apparatuses may have a function to receive printing instructions from personal computers (PCs) or other external devices via wireless transmission. For example, JP-2009-292123-A proposes an image forming apparatus using a near-field wireless communication technology. The image forming apparatus has a built-in antenna for near-field wireless communication in an apparatus body to receive printing instructions from PCs, digital cameras, digital video cameras, or other devices to print images.

Such an image forming apparatus, e.g., a printer having a near-field wireless communication device may allow a user to selectively use the printer via wireless connection with the wireless communication device or wired connection with a wired cable. In a method for selectively using wireless connection or wired connection, for example, to maintain a constant connection of the wireless communication device to the printer, a first input unit dedicated for the wireless communication device and a second input unit for wired connection are separately provided, and a connector of a wired cable is connected to a connection port of the second input unit for wired connection.

However, for the method, the two input units for wireless connection and wired connection need be provided to input image data, thus resulting in increased cost. In addition, the space for the input units on an electric board is limited, thus causing difficulty in the arrangement of the two input units.

BRIEF SUMMARY

In an aspect of this disclosure, there is provided an image forming apparatus for receiving a printing instruction of image data and forming an image according to the printing instruction. The image forming apparatus includes a wireless communication device, an input unit, and a connector storage portion. The wireless communication device is disposed at a body of the image forming apparatus and has a cable and an output connector connected to the cable. The input unit has a wireless connection port to connect the output connector of the wireless communication device via the cable and a wired connection port to connect a wired cable from an external device. The input unit receives a printing instruction from any one of the wireless connection port and the wired connection port. The connector storage portion stores the output connector removed from the wireless connection port when the wireless communication device is not used. The connector storage portion, the wireless connection port, and the wired connection port are concentrated in one location.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
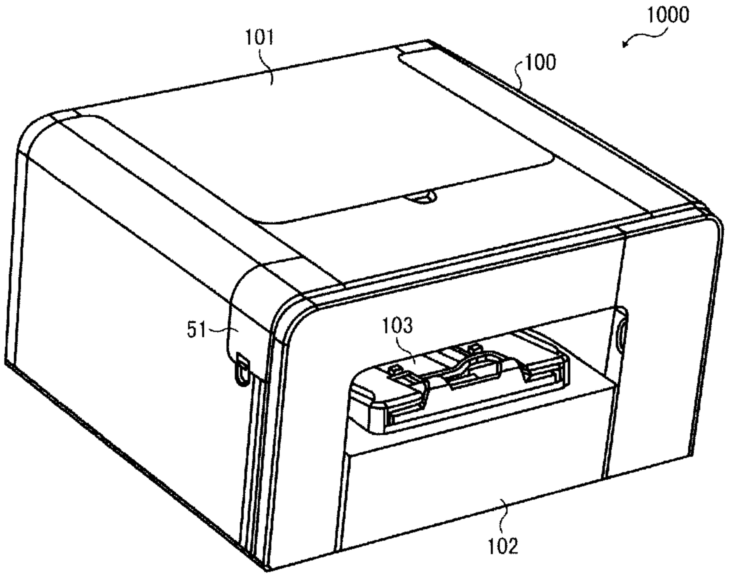
FIG. 1 is an external perspective view of an image forming apparatus according to an exemplary embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION OF EXEMPLARY EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the exemplary embodiments are described with technical limitations with reference to the attached drawings, such description is not intended to limit the scope of the invention and all of the components or elements described in the exemplary embodiments of this disclosure are not necessarily indispensable to the present invention.

Referring now to the drawings, wherein like reference numerals designate identical or corresponding parts throughout the several views, exemplary embodiments of the present disclosure are described below.

First, an image forming apparatus according to an exemplary embodiment of the present disclosure is described with reference to FIGS. 1 and 2.

FIG. 1 is an external perspective view of the image forming apparatus. FIG. 2 is a plan view of a mechanical section of the image forming apparatus.

Figure 2:
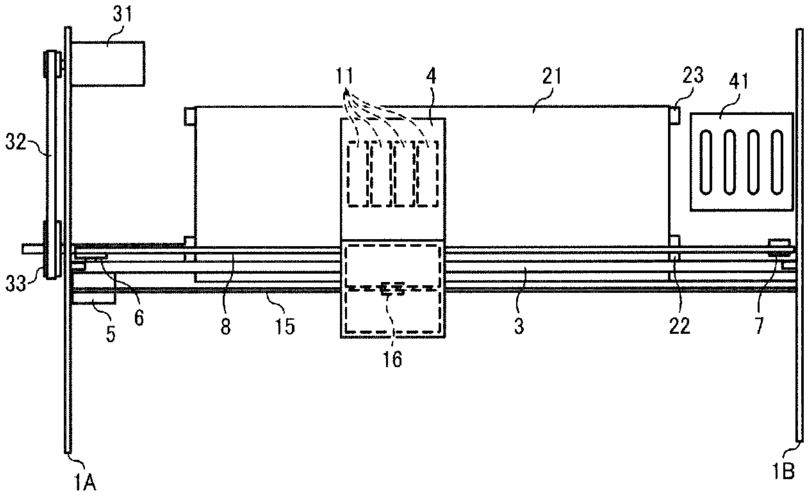
FIG. 2 is a plan view of a mechanical section of the image forming apparatus of FIG. 1.

The image forming apparatus illustrated in FIGS. 1 and 2 is a serial-type inkjet printer 1000 and has an openable cover

101 at an upper face side of a body 100. By opening the cover 101, an operator can access the mechanical section inside the body 100.

As illustrated in FIG. 2, the mechanical section includes a main left-side plate 1A, a main right-side plate 1B, a guide member 3, a carriage 4, a main scanning motor 5, a driving pulley 6, a driven pulley 7, and a timing belt 8. The guide member 3 extends between the main side plates 1A and 1B to support the carriage 4. The carriage 4 is supported on the guide member 3 so as to be slidable in a main scanning direction. The carriage 4 is moved for scanning in the main scanning direction by the main scanning motor 5 via the timing belt 8 extending between the driving pulley 6 and the driven pulley 7.

The carriage 4 mounts recording head units 11 and head tanks. The recording head units 11 (hereinafter also simply referred to as "recording heads 11") are liquid ejection heads serving as image forming devices to eject ink droplets of different colors, for example, yellow (Y), cyan (C), magenta (M), and black (K). The head tanks supply ink to the recording heads. The recording heads 11 are mounted on the carriage 4 so that multiple nozzle rows each including a plurality of nozzles are arranged parallel to a sub scanning direction perpendicular to the main scanning direction and ink droplets are ejected downward from the nozzles. The recording heads 11 and a head holder holding the recording heads 11 are integrally mounted on the carriage 4 as a single unit.

An encoder scale 15 is disposed along the main scanning direction of the carriage 4. The carriage 4 mounts an encoder sensor 16 serving as a transmissive photosensor to read a scale (scale index serving as position identifier) of the encoder scale 15. The encoder scale 15 and the encoder sensor 16 form a linear encoder serving as a position detector to detect the position and speed of the carriage 4.

Below the carriage 4 is disposed a conveyance belt 21 serving as a conveyance unit to convey a recording medium in the sub-scanning direction. The conveyance belt 21 is an endless belt looped around a conveyance roller 22 and a tension roller 23. The conveyance roller 22 is rotated by a sub-scanning motor 31 via a timing belt 32 and a timing pulley 33. The rotation of the conveyance roller 22 causes the conveyance belt 21 to circulate in the sub-scanning direction.

At one end in the main scanning direction of the carriage 4, a maintenance device (maintenance-and-recovery device) 41 is disposed near one lateral side of the conveyance belt 21 to maintain and recover nozzle conditions of the recording heads 11. The maintenance device 41 includes, for example, cap members, a wiping member, and a liquid receptacle. The cap members cap nozzle faces (i.e., faces in which nozzle are formed) of the recording heads 11. The wiping member wipes the nozzle faces of the recording heads. The liquid receptacle receives droplets ejected by maintenance ejection (flushing) in which liquid droplets not contributing to a resultant image are ejected for, e.g., preventing clogging of nozzles.

As illustrated in FIG. 1, the image forming apparatus further includes a sheet feed tray 102 and a sheet output tray 103 removably mounted to the body 100. The sheet feed tray 102 serves as a sheet feed unit to store and feed sheets to the conveyance belt 21. The sheet output tray 103 serves as a sheet output unit to output a recording medium on which ink droplets ejected from the recording heads 11 has adhered to form an image. It is to be noted that the term "sheet" used herein is not limited to a sheet of paper but be, e.g., an OHP (overhead projector) sheet or anything on which droplets of ink or other liquid can be adhered. In other words, the term "sheet" is used as a generic term including a recording medium, a recorded medium, a recording sheet, or a recording sheet of paper. The sheet output tray 103 is disposed above the sheet feed tray 102 and is rotatable around a shaft 120 disposed at its rear side. The sheet output tray 103 has an extending portion extendable to store a relatively large size of recording media.

While moving the carriage 4 in the main scanning direction, the printer 1000 having the above-described configuration drives the recording heads 11 according to image signals to eject ink droplets onto a recording medium conveyed intermittently by the conveyance belt 21. After a first line of a desired image is recorded on the recording medium, the recording medium is conveyed at a certain distance by the conveyance belt 21. Then, another line of the image is recorded on the recording medium and the recording medium is conveyed at the certain distance. Such operation is repeated to form the full image and then the recording medium having the image is output to the sheet output tray 103.

To output images from the printer 1000, the printer 1000 is connected to an external device, e.g., a personal computer (PC) via a cable, e.g., a universal serial bus (USB) cable to receive signals output from the external device. Hence, the printer 1000 has a connecting portion 50 for cable connection and a connector cover 51 removably mounted to the body 100 to cover the connecting portion 50.

Figure 3:
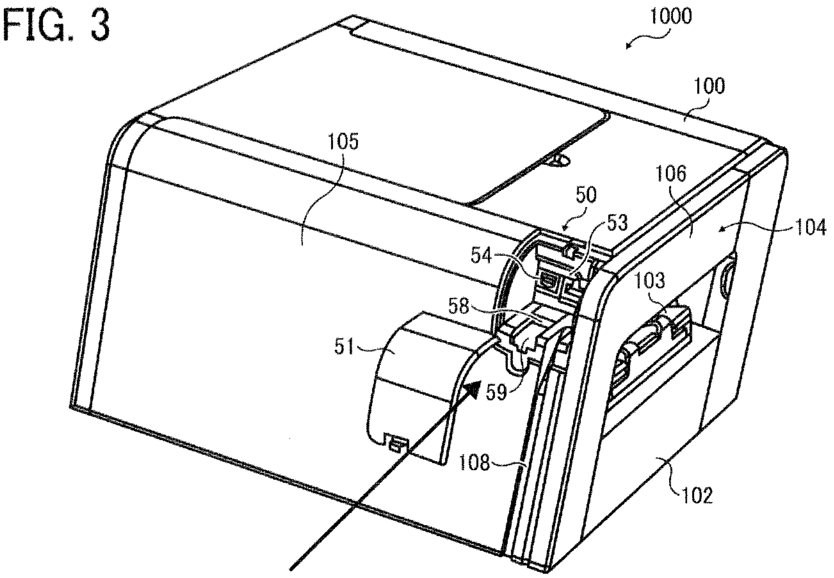
FIG. 3 is a perspective view of the image forming apparatus of FIG. 1 in a state in which a connector cover is removed.

FIG. 3 is a perspective view of the printer 1000 in a state in which the connector cover 100 is removed from the body 100.

In FIG. 3, when a face from which a user can access the sheet feed tray 102 and the sheet output tray 103 is referred to as a front face 104, the connecting portion 50 is disposed at a position adjacent to the front face 104 at an upper portion of a left side face 105. In FIG. 3, the connector cover 51 is illustrated in a floating state in the air for sake of convenience.

The connecting portion 50 exposed by removing the connector cover 51 has an internal space having a cross section of a fan shape and a thickness corresponding to the width of the connector cover 51. A USB connection port 54 to connect a USB cable 55 is disposed at a vertical face 53 opposing a face of the connector cover 51. At a portion of the left side face 105 proximal to the front face 104 is disposed a guide groove 108 vertically extending and connected to the connecting portion 50 to accommodate the USB cable 55.

Instead of using such a USB cable to transmit image data, near-field wireless communication technology can be used to transmit data in a non-contact manner by bringing devices close to each other. One example of the near-field wireless communication technology is a wireless local area network (LAN). Typically, it is favorable to locate a wireless LAN device at a position close to a user accessing the device. Hence, in this exemplary embodiment, the wireless LAN device is preferably disposed near the front face 104 of the printer 1000.

Figure 4:
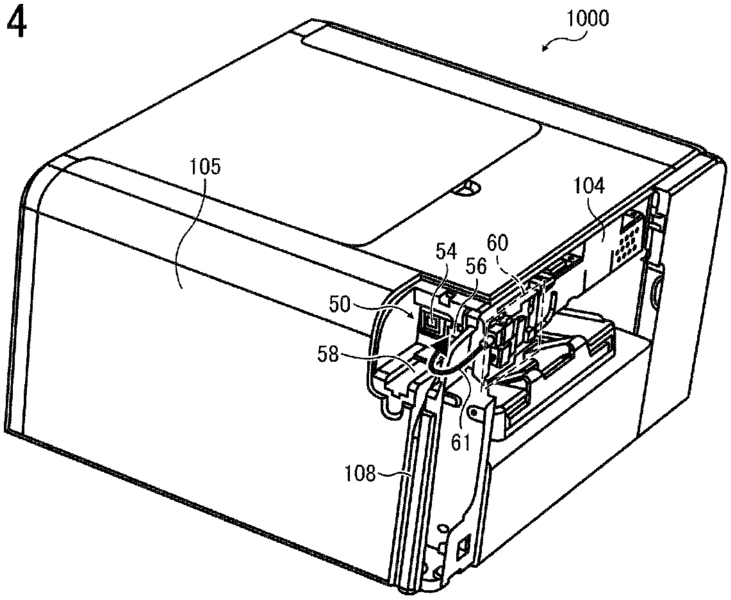
FIG. 4 is a perspective view of the image forming apparatus of FIG. 1 in a state in which the connector cover and a front face plate are removed.

FIG. 4 is a perspective view of the printer 1000 in a state in which a front cover 106 is removed from the body.

In FIG. 4, the front cover 106 and the connector cover 51 are omitted for simplicity. A wireless LAN device 60 is disposed near the front face 104 of the printer 1000. The wireless LAN device 60 has a function of antenna to receive radio waves from PCs or other external devices and transmit printing instructions to, e.g., a controller of the printer 1000 to print images.

Figure 5:
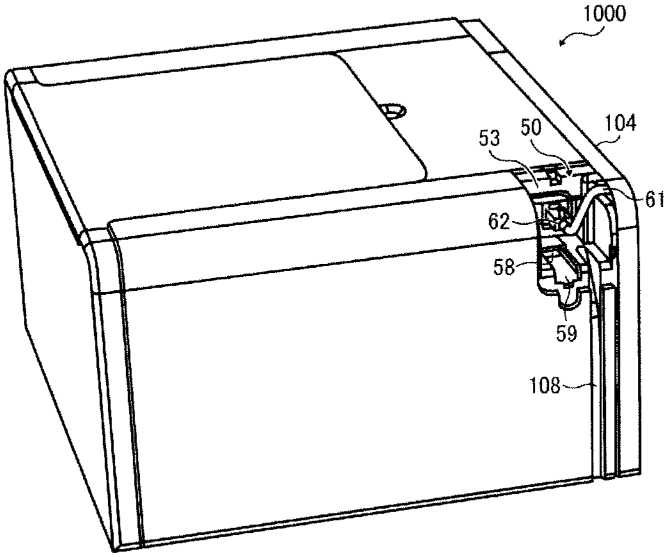
FIG. 5 is a perspective view of the image forming apparatus of FIG. 1 in a state in which a wireless local area network (LAN) device is used.

Data are input from the wireless LAN device 60 to an input unit of the printer 1000. In this exemplary embodiment, the input unit is not dedicated for the wireless LAN device 60 but is also used as an input unit for wired LAN to connect a wired LAN cable. As illustrated in FIGS. 3 to 5, the USB connection port 54 and a LAN connection port 56 usable for both wireless LAN and wired LAN are arranged side by side on the vertical face 53 of the connecting portion 50. When the wireless LAN device 60 is used, as illustrated in FIG. 5, a LAN connector 62 is connected to the LAN connection port 56. When the wired LAN is used, the LAN connector 62 is removed from the LAN connection port 56 and a connector of a wired LAN cable is connected to the LAN connection port 56.

Figure 7:
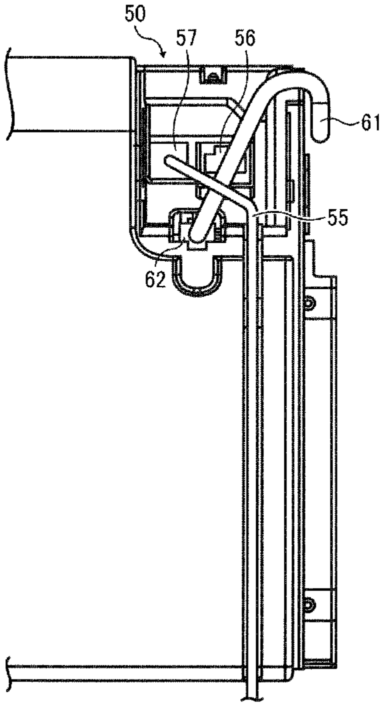
FIG. 7 is a schematic view of the connecting portion in a state in which an external device is used via a universal serial bus (USB) cable.

When an external device is connected via the USB cable 55, as illustrated in FIG. 7, the LAN connector 62 is removed from the LAN connection port 56 and stored in a connector storage portion 58. A USB connector 57 of the USB cable 55 is connected to the USB connection port 54 for use. Even with the USB connector 57 of the USB cable 55 being connected to the USB connection port 54, the wireless LAN is available.

Figure 6:
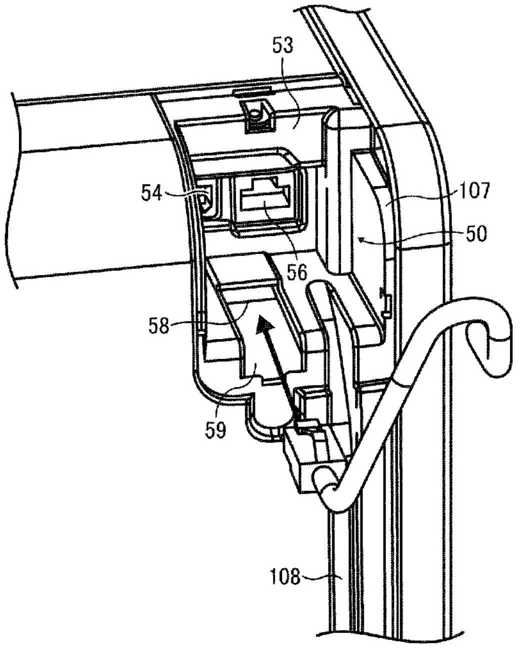
FIG. 6 is a partially enlarged view of a connecting portion including a connector storage portion to store a LAN connector.

For the printer 1000 according to this exemplary embodiment, when an external device is used via a wired LAN cable, the wired LAN cable is connected to the LAN connection port 56. Therefore, the LAN connector 62 need be removed from the LAN connection port 56. In addition, for the printer 1000, the connecting portion 50 has the connector storage portion 58 to store the LAN connector 62 removed from the LAN connection port 56. As illustrated in FIG. 6, the connector storage portion 58 is formed at a flat face 59 substantially perpendicular to the vertical face 53 opposing a face of the connector cover 51 so as to have such a size that the LAN connector 62 can fit in the connector storage portion 58. The connector storage portion 58 can be slid over the flat face 59 to be inserted to the connector storage portion 58.

As described above, since the USB connection port 54, the LAN connection port 56, and the connector storage portion 58 are concentrated in the connecting portion 50, it is convenient for a user to be able to see all connecting portions by seeing only the connecting portion 50 when the printer 1000 is connected to a PC or other external device. In addition, the connecting portion 50 is covered by the connector cover 51, thus enhancing the appearance of the printer 100 and preventing accidental cable removal.

A cable 61 of the wireless LAN device 60 is flexible and has a relatively large diameter. The cable 61 running from the wireless LAN device 60 is substantially U-turned, and the LAN connector 62 mounted on a leading end of the cable 61 is connected to the LAN connection port 56. In such a case, a guide groove 107 of, e.g., a substantially arc shape is formed between the front face and the left side face of the printer 1000 so that the cable 61 can pass through the guide groove 107. The cable 61 running from the wireless LAN device 60 at the front face of the printer 1000 passes through the guide groove 107, turns around to the left side face, and is connected to the LAN connection port 56.

The length of the cable 61 running from the wireless LAN device 60 is set to a proper length so that a user can connect the LAN connector 62 to the LAN connection port 56 without difficulties and the cable 61 U-turned does not interfere with the installation of the connector cover 51. In addition, to use an external device via the USB cable 55, the length of the cable 61 is set to a proper length so that, even when the LAN connector 62 is stored in the connector storage portion 58, the cable 61 U-turned does not interfere with the installation of the connector cover 51.

Figure 8:
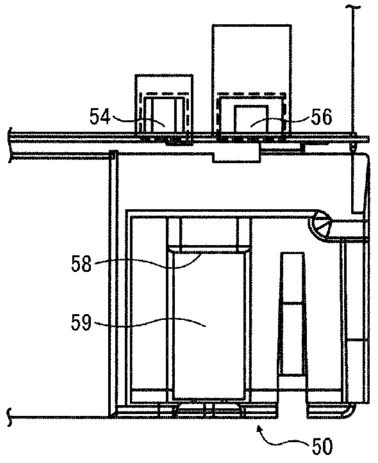
FIG. 8 is a plan view of the connecting portion.

To facilitate the setting of the length of the cable 61, the positions of the LAN connection port 56 and the connector storage portion 58 are determined as follow. That is, for the length of the cable 61, it is preferable to match a first distance from the LAN connection port 56 to a U-turn position of the guide groove 107 at which the cable 61 is U-turned and a second distance from the connector storage portion 58 to the U-turn position of the guide groove 107. In FIG. 7, the first distance from the LAN connection port 56 to the U-turn position of the guide groove 107 is shorter than the second distance from the connector storage portion 58 to the U-turn position of the guide groove 107. However, as illustrated in FIG. 8, the LAN connection port 56 is located more inward of the body than the connector storage portion 58 so that the first distance and the second distance substantially match, thus allowing proper setting of the length of the cable 61.

Next, a description is given of switching operation from wireless connection via the wireless LAN device 60 to wired connection to an external device via the USB cable 55.

First, the connector cover 51 is removed, and the USB connector 57 led to the connecting portion 50 via the guide groove 108 is connected to the USB connection port 54. Next, the LAN connector 62 is removed from the LAN connection port 56 and stored in the connector storage portion 58. At this time, since the USB connector 57 is already connected to the USB connection port 54, the cable 61 and the USB cable 55 cross each other in FIG. 7. However, as illustrated in FIG. 8, since the USB connection port 54 is located more inward of the body than the connector storage portion, the USB cable 55 connected to the USB connection port 54 does not interfere with the handling of the LAN connector 62. To switch from wireless connection with the wireless LAN device 60 to wired connection to an external device via the USB cable 55, the LAN connector 62 may be removed from the LAN connection port 56 before the USB connector 57 is connected to the USB connection port 54. In such a case, since the LAN connector 62 is moved in advance, there is no problem in handling of the LAN connector 62.

Figure 9:
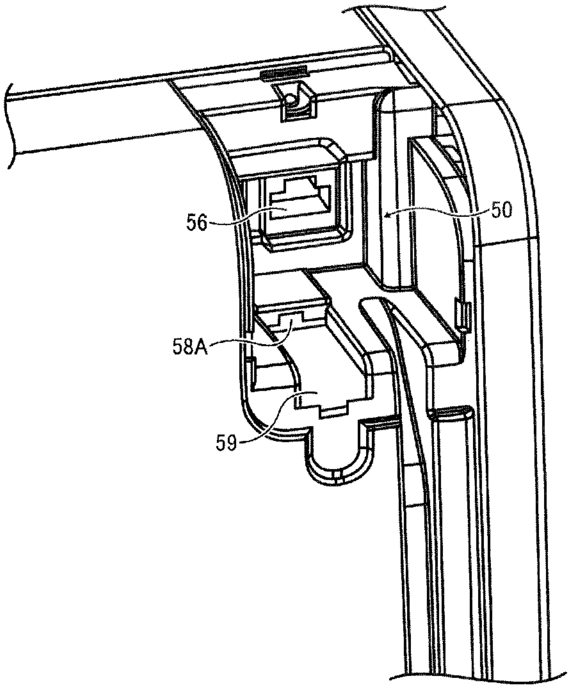
FIG. 9 is an enlarged perspective view of a connecting portion according to another exemplary embodiment of this disclosure.

FIG. 9 shows another exemplary embodiment of this disclosure.

In FIG. 9, a connector storage portion 58A has the same convex shape as that of the LAN connector 62 when seen from the front side. As a result, when the wireless LAN device 60 is not used, the LAN connector 62 inserted to the connector storage portion 58A can be stored without looseness, thus preventing vibration and noise of the LAN connector 62 due to vibration of the printer 1000.

As described above, in the above-described exemplary embodiments, the image forming apparatus receives a printing instruction from any one of the wireless connection port and the wired connection port and has a connector storage portion to store the output connector of the wireless communication device removed from the wireless connection port when the wireless communication device is not used. The connector storage portion, the wireless connection port, and the wired connection port are concentrated in one location. Such a configuration allows a user to selectively use wireless connection with the wireless communication device and wired connection with a wired cable at a reduced cost.

In the above-described exemplary embodiments, the image forming apparatus is described as an inkjet-type printer. However, it is to be noted that the image forming apparatus is not limited to the inkjet printer but may be, for example, an electrophotographic-type image forming apparatus.

Numerous additional modifications and variations are possible in light of the above teachings. It is therefore to be understood that, within the scope of the appended claims, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image forming apparatus for receiving a printing instruction of image data and forming an image according to the printing instruction, the apparatus comprising:

a wireless communication device disposed at a body of the image forming apparatus and having a cable and an output connector connected to the cable;

an input unit having a wireless connection port to connect the output connector of the wireless communication device via the cable and a wired connection port to connect a wired cable from an external device, the input unit receiving a printing instruction from any one of the wireless connection port and the wired connection port; and a connector storage portion to store the output connector removed from the wireless connection port when the wireless communication device is not used, the connector storage portion, the wireless connection port, and the wired connection port concentrated in one location.

2. The image forming apparatus of claim 1, further comprising a connecting portion disposed at a position adjacent to a front face of the body at a side face of the body, wherein the wireless connection port, the wired connection port, and the connector storage portion are concentrated in the connecting portion.

3. The image forming apparatus of claim 2, further comprising a cover removably mounted to the body to cover the connecting portion.

4. The image forming apparatus of claim 2, further comprising a guide groove formed at the body to guide the wired cable into the connecting portion.

5. The image forming apparatus of claim 4, wherein the wired connection port is disposed more rearward of the body than the wireless connection port, and the connector storage portion is disposed more rearward of the body than the guide groove.

6. The image forming apparatus of claim 5, wherein the wireless connection port and the wired connection port are disposed higher than the connector storage portion.

7. The image forming apparatus of claim 6, wherein the connector storage portion is disposed at a position between the wireless connection port and the wired connection port in horizontal direction.

8. The image forming apparatus of claim 2, further comprising a guide groove of a substantially arc shape formed at the body, wherein the cable runs from the wireless communication device disposed at the front face of the body, passes through the guide groove, turns around to the side face of the body, and is connected to the wireless connection port.

9. The image forming apparatus of claim 1, wherein, when the output connector of the wireless communication device is connected to the wireless connection port, the output connector has same posture with respect to vertical direction as when the output connector is stored in the connector storage portion.

10. The image forming apparatus of claim 1, further comprising a guide groove disposed higher than the wireless connection port to guide the cable of the wireless communication device.

11. The image forming apparatus of claim 1, wherein the wireless connection port is disposed more inward of the body than the connector storage portion.

* * * * *